US008689831B2

(12) United States Patent
Whiting et al.

(10) Patent No.: US 8,689,831 B2
(45) Date of Patent: Apr. 8, 2014

(54) ROTARY FLUID VALVE ASSEMBLIES, SYSTEMS AND METHODS

(75) Inventors: Frederick Joseph Whiting, La Grange, IL (US); Griffin McNeil Doak, Downers Grove, IL (US)

(73) Assignee: Whiting Technologies Corporation, Willowbrook, IL (US)

( * ) Notice: Subject to any disclaimer, the term of this patent is extended or adjusted under 35 U.S.C. 154(b) by 193 days.

(21) Appl. No.: 13/253,446

(22) Filed: Oct. 5, 2011

(65) Prior Publication Data

US 2012/0085414 A1 Apr. 12, 2012

Related U.S. Application Data

(60) Provisional application No. 61/391,910, filed on Oct. 11, 2010.

(51) Int. Cl.
*F16K 11/074* (2006.01)
(52) U.S. Cl.
USPC ................... 137/625.46; 137/625.11
(58) Field of Classification Search
USPC ............. 137/625.47, 625.46, 625.11, 625.17, 137/874, 862, 887; 251/344, 345
See application file for complete search history.

(56) References Cited

U.S. PATENT DOCUMENTS

| | | | | |
|---|---|---|---|---|
| 3,454,049 | A | * | 7/1969 | Hoos ........................ 137/625.65 |
| 4,635,678 | A | * | 1/1987 | Peterman et al. ............. 137/551 |
| 5,027,706 | A | | 7/1991 | Niemiro et al. |
| 5,179,978 | A | | 1/1993 | Simms et al. |
| 5,332,194 | A | * | 7/1994 | Austin et al. .................. 251/345 |

* cited by examiner

*Primary Examiner* — John Rivell
*Assistant Examiner* — Michael R Reid
(74) *Attorney, Agent, or Firm* — Nixon & Vanderhye P.C.

(57) ABSTRACT

Rotary valves are provided having an elongate spool defining coaxially aligned inlet and outlet ports for respectively receiving and discharging a fluid, and spool inlet and outlet orifices. A rotary cage assembly defines an annular cage recess and cage inlet and outlet orifices in communication with the recess and coaxially surrounds the spool for reciprocal rotations thereabout. An actuator assembly is coupled to the rotary cage assembly for moving the rotary cage assembly between open and closed positions. When in the open position the cage inlet and outlet orifices are in fluid communication with the spool inlet and outlet orifices, respectively, to allow fluid to flow from the spool inlet port to the spool outlet port by way of the annular cage recess. When in the closed position however fluid communication is blocked between at least the cage and spool outlet orifices.

24 Claims, 5 Drawing Sheets

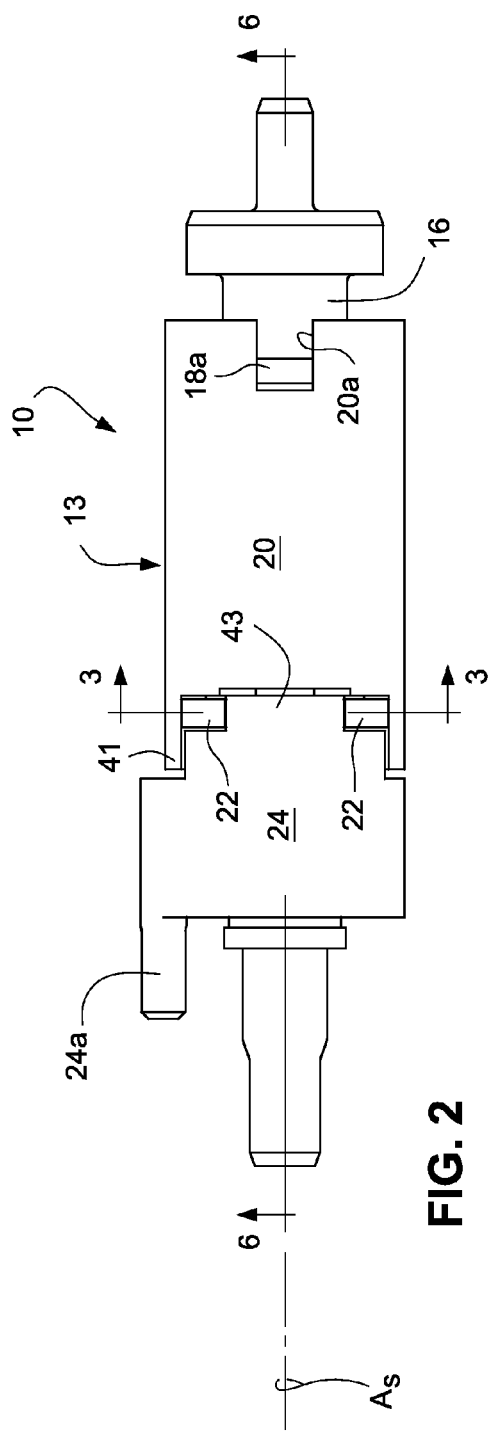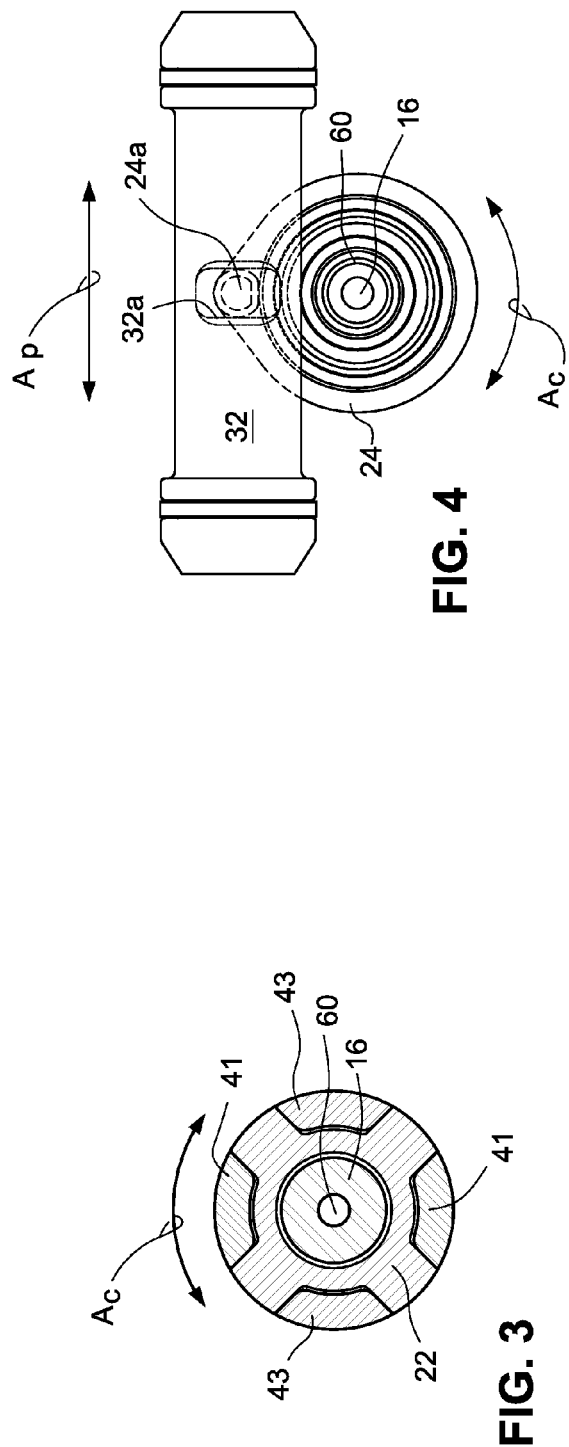

(OUTLET CLOSED)

(OUTLET MID-STROKE)

(OUTLET OPEN)

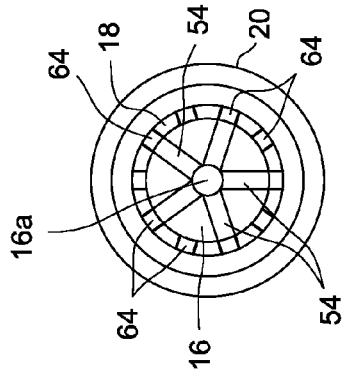
FIG. 11C (INLET OPEN)
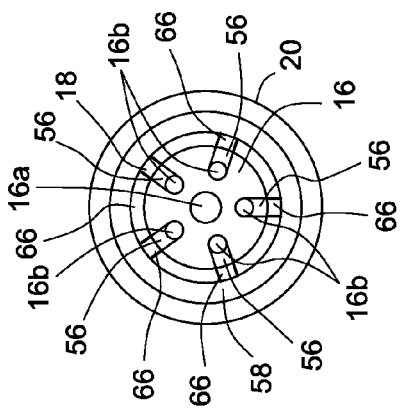
FIG. 12C (BYPASS OPEN)
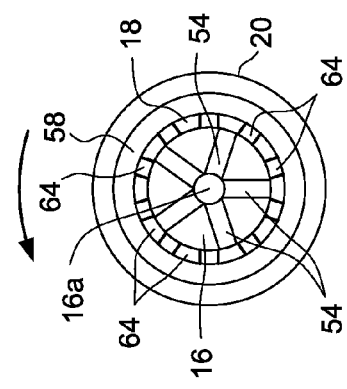
FIG. 11B (INLET MID-STROKE)
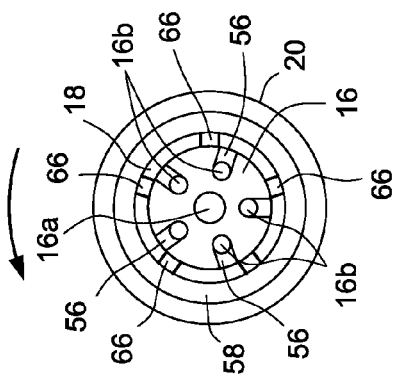
FIG. 12B (BYPASS MID-STROKE)
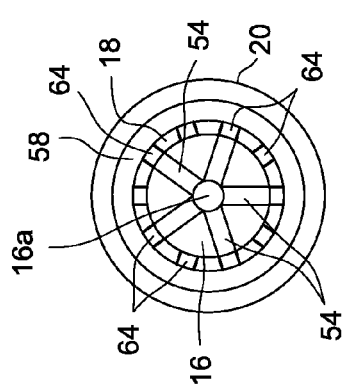
FIG. 11A (INLET OPEN)
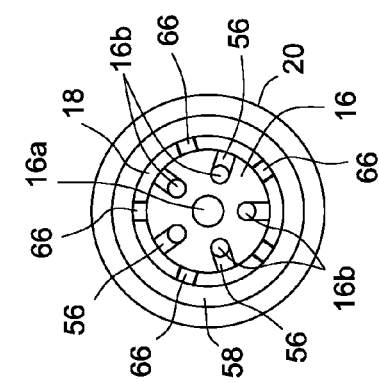
FIG. 12A (BYPASS CLOSED)

ROTARY FLUID VALVE ASSEMBLIES, SYSTEMS AND METHODS

CROSS-REFERENCE TO RELATED APPLICATION

This application is based on and claims domestic priority benefits under 35 USC §119(e) from U.S. Provisional Application Ser. No. 61/391,910 filed on Oct. 11, 2010, the entire content of which is expressly incorporated by reference herein.

FIELD

The disclosed exemplary embodiment of the invention to be discussed below relates generally to fluid delivery systems that are usefully employed in industrial equipment, such as, for example, hydraulic equipment or newspaper printing presses.

BACKGROUND

In industrial equipment, it is often necessary to intermittently vary the volume of a fluid such as hydraulic fluid or printing ink. By way of a specific example, in the case of printing ink, precise metering is desirable to ensure a quality printed image. A majority of existing printing equipment relies on ink metering systems that lack precision and user control and are reliant upon complicated adjustments to improve image quality. Moreover, many of the conventional valves are limited to relatively low operating pressures (e.g., pressures of only about 70-100 psi).

It would therefore be desirable to provide rotary fluid valves that address the various problems noted above with respect to conventional fluid delivery systems. It is toward fulfilling such needs that the present invention is directed.

SUMMARY OF EXEMPLARY EMBODIMENTS

According to certain embodiments, a rotary valve is providing having an elongate spool defining coaxially aligned inlet and outlet ports for respectively receiving and discharging a fluid, and spool inlet and outlet orifices. A rotary cage assembly defines an annular cage recess and cage inlet and outlet orifices in communication with the recess and coaxially surrounds the spool for reciprocal rotations thereabout. An actuator assembly is coupled to the rotary cage assembly for moving the rotary cage assembly between open and closed positions. When in the open position the cage inlet and outlet orifices are in fluid communication with the spool inlet and outlet orifices, respectively, to allow fluid to flow from the spool inlet port to the spool outlet port by way of the annular cage recess. When in the closed position however fluid communication is blocked between at least the cage and spool outlet orifices, whereby fluid is prevented from flowing from the spool inlet port to the spool outlet port.

Some embodiments of the rotary valve are provided with a spool that further defines a bypass port and bypass orifice in communication therewith, and a cage which cage further defines a cage bypass orifice in fluid communication with the annular cage recess. In such embodiments, the cage assembly when in the open condition prevents fluid communication between the cage and spool bypass orifices, but when in the closed condition allows fluid communication between the cage and spool inlet orifices and between the cage and spool bypass orifices, whereby fluid entering the annular cage recess from the spool inlet port through the spool inlet orifice is allowed to flow into the spool bypass port through the cage bypass orifice.

The actuator assembly may comprise a rotary actuator coaxially coupled to the cage assembly. Additionally (or alternatively) the cage and actuator assemblies may include cage and actuator driving dogs, respectively. The actuator assembly may thus further include a coupling block operatively coupling the cage and actuator driving dogs to one another to allow for torque to be transmitted between the actuator assembly to the cage assembly.

Some embodiments may be provided with an actuator assembly which comprises a rectilinearly moveable actuator member coupled operative to the rotary actuator member such that reciprocal rectilinear movements of the rectilinearly moveable actuator member are translated into reciprocal rotational movements of the rotary actuator member. Operative coupling between the rectilinearly and rotary actuator members may be provided by a slot formed in the rectilinearly moveable actuator member, and an outwardly protruding actuator finger formed on the rotary actuator member which is received within the slot.

The cage assembly may include an inner cage member which defines the cage inlet and outlet orifices, and an outer cage member coaxially surrounding and integrally coupled to the inner cage member, wherein the cage recess is defined between the inner and outer cage members. Additionally (or alternatively) the outer cage may define a cage slot and the inner cage may define an outwardly protruding lug received within the cage slot so as to integrally couple the inner and outer cages to one another.

According to another aspect, the rotary valve may be a part of a fluid delivery system, whereby fluid under pressure is capable of being selectively delivered from a fluid source through the outlet port of the spool. A method for delivering fluid under pressure is also contemplated whereby an elongate fixed position fluid supply spool is provided having coaxially aligned spool inlet and outlet ports and spool inlet and outlet orifices in respective fluid communication with the spool inlet and outlet ports. Fluid may thus be supplied under pressure to a spool inlet port associated with the spool. The fluid may be selectively delivered through the spool outlet port by operating a rotary cage assembly surrounding the spool and having an annular cage recess, and cage inlet and outlet orifices so that the rotary cage assembly rotationally moves from a closed position to an open position. When in the closed position, fluid communication is blocked between at least the cage and spool outlet orifices, whereby fluid is prevented from flowing from the spool inlet port to the spool outlet port through the annular cage recess, whereas when in the open position the cage inlet and outlet orifices are in fluid communication with the spool inlet and outlet orifices, respectively, to allow fluid to flow from the spool inlet port to the spool outlet port by way of the annular cage recess.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 2 is an external side view of a rotary fluid valve assembly that is employed in the system depicted in FIG. 1;

FIG. 3 is a cross-sectional elevational view of the rotary fluid valve assembly as taken along line 3-3 in FIG. 2;

FIG. 4 is an end view of the rotary valve assembly depicted in FIG. 2 operatively connected to an pneumatic piston actuator;

FIGS. 11A-11C depict the relationship between inlet porting orifices in the spool and inner cage at different intervals of the fluid valve switching cycle; and FIGS. 12A-12C depict the relationship between bypass porting orifices in the spool and inner cage at different intervals of the fluid valve switching cycle.

DETAILED DESCRIPTION

Figure 1:
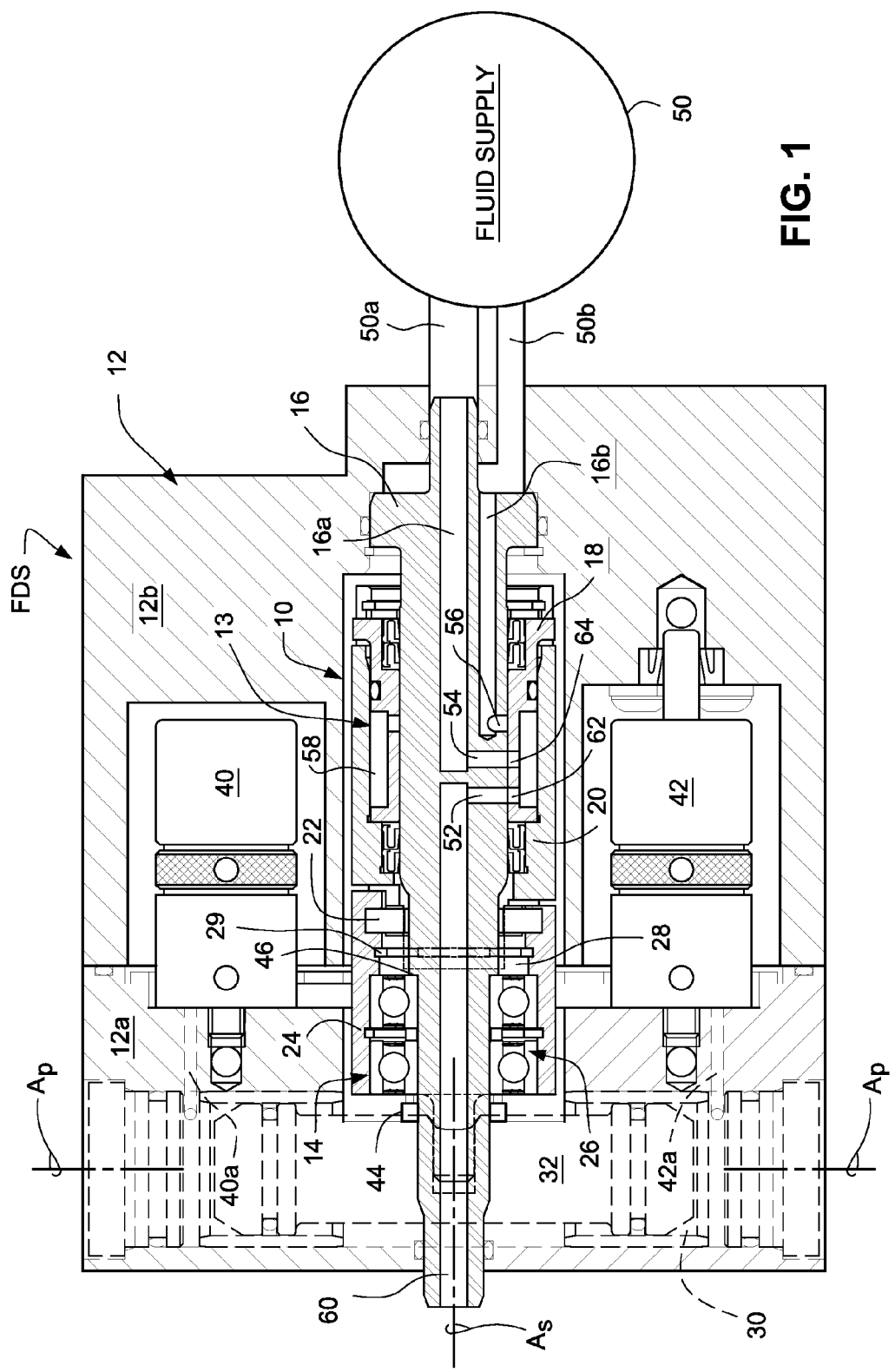
FIG. 1 is a cross-sectional view of a fluid delivery system in accordance with one exemplary aspect of the invention.

Accompanying FIG. 1 depicts an exemplary embodiment of a fluid delivery system FDS according to the invention. As can be seen, the fluid delivery system FDS includes a rotary valve assembly 10 housed within a manifold assembly 12 formed of cooperatively joined manifold parts 12a, 12b. The rotary valve assembly 10 includes a cage assembly 13 and an actuator assembly 14 mounted for rotational movement coaxially around the exterior surface of an elongate spool 16. The spool 16 is immovably fixed within the manifold part 12b, while the cage and actuator assembly 14 is retained coaxially by manifold part 12a for rotational movements coaxially around the spool 16 and its axis $A_s$.

The cage assembly 13 includes an inner cage 18 coaxially nested within an outer cage 20. The actuator assembly 14 generally includes a rotatable actuator member 24 having an outwardly protruding actuator finger 24a. Bearings 26, a spacer 28 and a snap ring 29 are provided so as to operatively mount the cage and actuator assemblies 13 and 14, respectively, relative to the spool 16 to permit coaxial rotational movements of the former about the latter (arrows $A_c$ in FIGS. 3 and 4).

The manifold part 12a defines an elongate bore 30 in which a rectilinearly moveable actuator member, such as pneumatic piston 32, is positioned for reciprocal axial displacements therewithin (i.e., reciprocal rectilinear displacements in the direction of arrow $A_p$ shown in FIG. 4 that is substantially transverse to the elongate axis $A_s$ of the spool 16 as shown in FIG. 1). Pneumatic valves 40, 42 are provided operatively within the manifold part 12b and pneumatically communicate via ports 40a, 42a with the bore 30 in which the displaceable piston 32 is positioned. An actuator finger 24a extends outwardly from the actuator 24 and engages within a slot 32a formed in the pneumatic piston 32 (see FIG. 4).

By alternately energizing and de-energizing normally closed or normally open pneumatic valves 40, 42, will cause the pneumatic piston 32 to reciprocally be displaced axially within the bore 30. Thus, for example, alternately energizing the pneumatic valves 40 and 42, may responsively cause the piston 32 to be displaced pneumatically in one direction within the bore 30, while de-energizing valves 40 and 42 may responsively allows the piston 32 to be displaced in the opposite direction. The reciprocal rectilinear movements of the pneumatic piston 32 will thus be translated into reciprocal rotary movements of the actuator 24 (and hence the cage and actuator assembly 14) in the directions of arrow $A_c$ shown in FIGS. 3 and 4 by virtue of the cooperative engagement of the actuator finger 24a of the actuator 24 within the slot 32a of the piston 32.

Rotation of the actuator 24 of the actuator assembly 14 in the direction of arrow $A_c$ is synchronously coupled to the inner and outer cages 18 and 20, respectively, of cage assembly 13 so that rotation of the former in turn causes rotation of the latter. As is perhaps seen best by FIGS. 1-3, the inner cage 18 is housed within the outer cage 20 and is prevented from rotating independently by lugs 18a of the inner cage being received within a respective slot 20a of the outer cage 20 (see FIG. 2). By means of such coupled interaction between the lugs 18a and slots 20a, the inner and outer cages 18, 20, respectively rotate as an integral unit.

As shown by FIG. 3, the coupling block 22 is positionally situated between cage driving dogs 41 and actuator driving dogs 43, allowing actuator 24 to transmit torque to outer cage 20. Bearings 26 are installed within actuator assembly 14 and around the outer diameter of spool 16. The bearings 26 are positionally held between a spacer 44 at one end and a bearing shoulder 46 at an opposite end. As noted previously the snap ring 29 prevents cage and actuator assemblies 18, 20, respectively, from moving axially relative to axis $A_s$.

Figure 5:
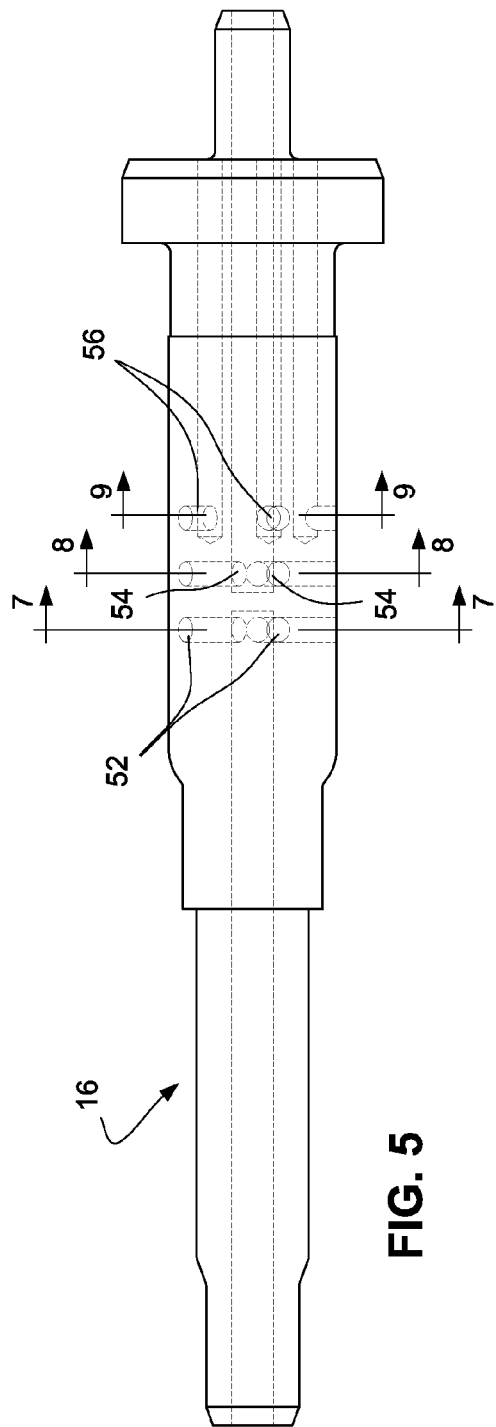
FIG. 5 is an external side view of the spool employed in the rotary fluid valve assembly depicted in FIG. 2.
Figure 6:
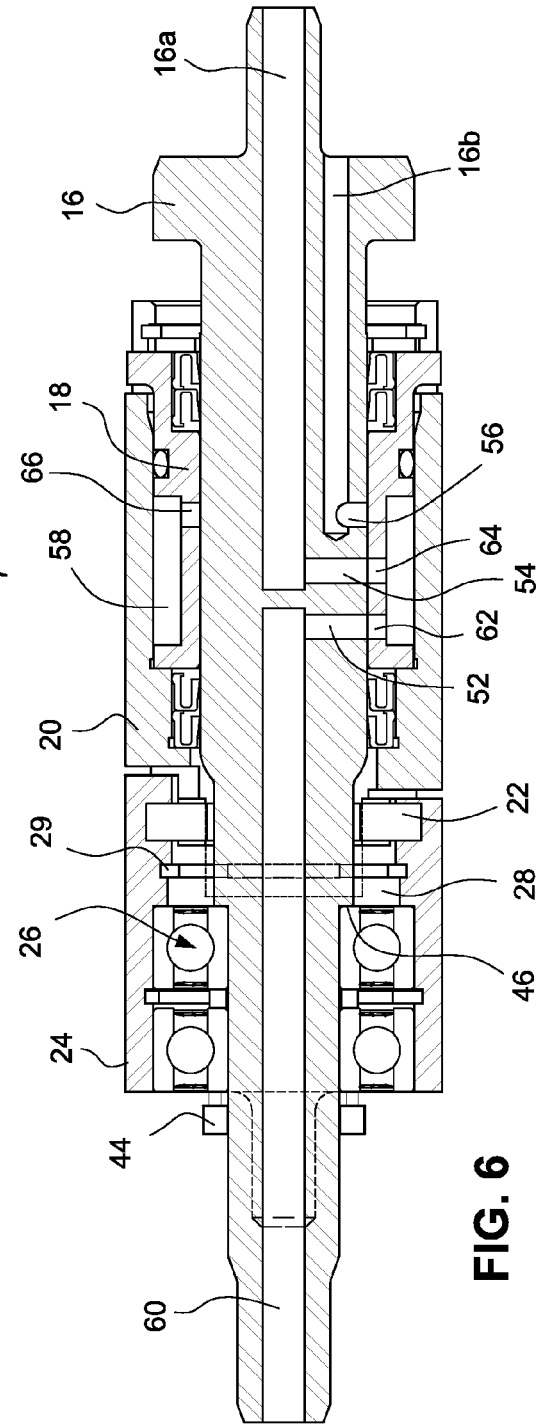
FIG. 6 is a cross-sectional elevational view of the rotary valve assembly depicted in FIG. 2 as taken along line 6-6 therein.
Figure 9:
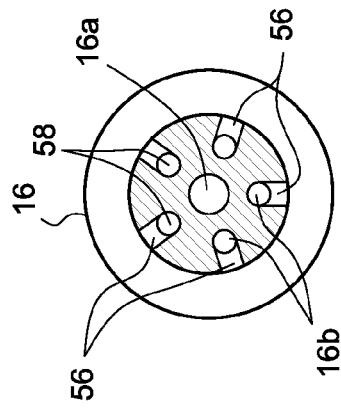
FIGS. 7-9 are cross-sectional elevational views of the spool depicted in FIG. 5 as taken along lines 7-7, 8-8 and 9-9, respectively.
Figure 8:
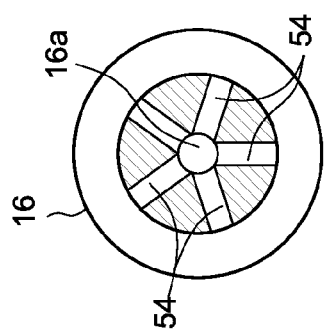
Figure 7:
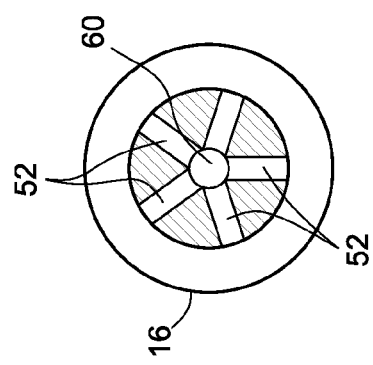

In operation, fluid under pressure is introduced into the manifold 12 from a pressurized fluid supply 50 through inlet conduit 50a. The pressurized fluid is in turn introduced into the rotary fluid valve assembly 10 through the axial spool inlet port 16a formed in the spool 16. The fluid may then pass through an annular pattern of substantially radially oriented spool inlet orifices 54 (see FIG. 5). When the cage and actuator assemblies 18, 20, respectively, are rotated as an integral unit into the position as shown by FIG. 11A or 11C, the fluid is allowed to pass through a similar annular pattern of substantially radially oriented cage inlet orifices 64 which are in fluid communication with an annular recess 58 defined between the inner and outer cages 18, 20, respectively. Substantially radially oriented cage outlet orifices 62 are also in fluid communication with recess 58, and substantially radially oriented spool outlet orifices 52 are in fluid communication with spool outlet port 60.

Figure 10C:
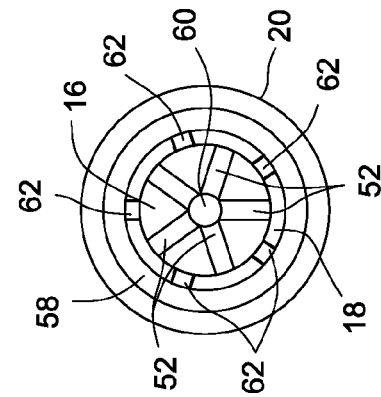
FIGS. 10A-10C depict the relationship between outlet porting orifices in the spool and inner cage at different intervals of the fluid valve switching cycle.
Figure 10B:
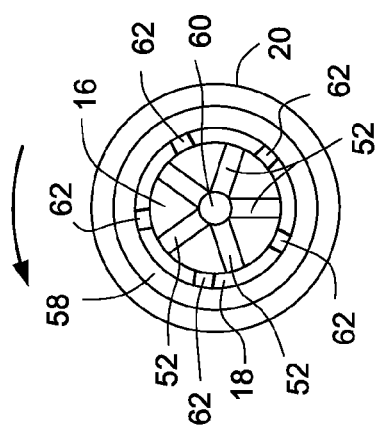
Figure 10A:
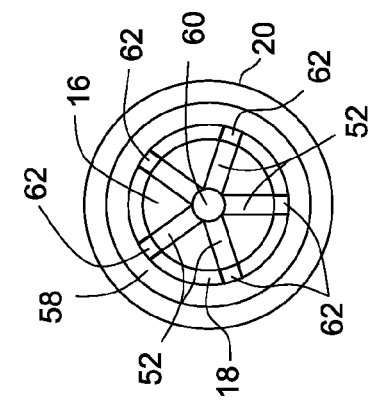

When the cage and actuator assemblies 13 and 14, respectively, are collectively rotated as an integral unit into the position shown by FIG. 10A, outlet orifices 52 and 62 align and allow unrestricted flow of fluid from pressurized fluid supply 50 to outlet port 60 and to thereby be discharged from the rotary fluid valve assembly 10. In such a position, the substantially radially oriented cage bypass orifices 66 are then in fluid communication with annular recess 58. The substantially radially oriented spool bypass orifices 56 are likewise in fluid communication with a pattern of axially oriented bypass return ports 16b. When the cage and actuator assemblies 13, 14, respectively, are rotated as an integral unit into the position shown by FIG. 12C, bypass orifices 56 and 66 align, allowing the fluid entering recess 58 via the inlet port 16a and the aligned orifices 54, 64 to be returned to pressurized fluid supply 50 through bypass ports 16b and return conduit 50b. In such a manner a substantially continuous flow of fluid may be maintained through the rotary valve assembly 10, with fluid being selectively delivered to the spool outlet port 60 as may be desired.

The positions shown by FIGS. 10A, 11A, and 12A occur substantially simultaneously due to the substantially radially oriented orifices 52, 54, and 56 being arranged annularly in axial rows along spool 16. As such, fluid from spool inlet port 16a is allowed to travel through inlet orifices 54 and 64 into recess 58 and then through outlet orifices 52 and 62 into spool outlet port 60 as previously described, whereas spool bypass orifices 56 are blocked from the flow of fluid. Similarly, the positions shown by FIGS. 10C, 11C, and 12C allow fluid to travel from recess 58 through bypass orifices 56 and 66, into bypass return ports 16b, and then back to fluid supply 50 as previously described, while spool outlet orifices 52 are blocked from fluid flow. The positions shown by FIGS. 10B, 11B, and 12B depict an intermediate mid-stroke position wherein no fluid is allowed to pass through any of the spool orifices 52, 54, or 56.

As can now be appreciated, the coaxial arrangement of the cage and actuator assemblies 13, 14, respectively, the coaxial alignment of the spool inlet and outlet ports 16b, 60, respectively, and/or the annular recess defined between the rotatable inner and outer cages 18, 20, respectively, contribute to the ability of the rotary valve assembly 10 being able to function at operational fluid pressures that are significantly greater (e.g., up to about 3000 psi) than the operational fluid pressures of prior rotary valves due to substantial absence of axial thrust loads.

In addition to the substantially greater operational pressures, the rotary valves according to the embodiments as described herein ensure that symmetrical coaxial rotational forces are reliably exerted on the rotary cage assembly 13 by virtue of the indirect connection between the cage assembly 13 and the rectilinearly moveable actuator (e.g., pneumatic piston 32) via the actuator assembly 14. As such, minimal (if any) side loads are exerted on the cage assembly 13 which allows for greater operational reliability.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A rotary valve comprising:
   an elongate spool defining coaxially aligned inlet and outlet ports for respectively receiving and discharging a fluid, and spool inlet and outlet orifices in fluid communication with the inlet and outlet ports, respectively;
   a rotary cage assembly coaxially surrounding the spool and mounted for reciprocal rotations thereabout, wherein the cage assembly defines an annular cage recess and oriented cage inlet and outlet orifices in communication with the recess; and
   an actuator assembly coupled to the rotary cage assembly for moving the rotary cage assembly between an open position wherein the cage inlet and outlet orifices are in fluid communication with the spool inlet and outlet orifices, respectively, to allow fluid to flow from the spool inlet port to the spool outlet port by way of the annular cage recess, and a closed position wherein fluid communication is blocked between at least the cage and spool outlet orifices, whereby fluid is prevented from flowing from the spool inlet port to the spool outlet port, wherein the spool further defines a bypass port and a bypass orifice in communication therewith, and wherein the cage further defines a cage bypass orifice in fluid communication with the annular cage recess, and wherein the cage assembly when in the open condition prevents fluid communication between the cage and spool bypass orifices, but when in the closed condition allows fluid communication between the cage and spool inlet orifices and between the cage and spool bypass orifices, whereby fluid entering the annular cage recess from the spool inlet port through the spool inlet orifice is allowed to flow into the spool bypass port through the cage bypass orifice.

2. A rotary valve assembly as in claim 1, wherein the actuator assembly comprises a rotary actuator coaxially coupled to the cage assembly.

3. A rotary valve assembly comprising:
   an elongate spool defining coaxially aligned inlet and outlet ports for respectively receiving and discharging a fluid, and spool inlet and outlet orifices in fluid communication with the inlet and outlet ports, respectively;
   a rotary cage assembly coaxially surrounding the spool and mounted for reciprocal rotations thereabout, wherein the cage assembly defines an annular cage recess and oriented cage inlet and outlet orifices in communication with the recess; and
   an actuator assembly coupled to the rotary cage assembly for moving the rotary cage assembly between an open position wherein the cage inlet and outlet orifices are in fluid communication with the spool inlet and outlet orifices, respectively, to allow fluid to flow from the spool inlet port to the spool outlet port by way of the annular cage recess, and a closed position wherein fluid communication is blocked between at least the cage and spool outlet orifices, whereby fluid is prevented from flowing from the spool inlet port to the spool outlet port, wherein the actuator assembly comprises a rotary actuator coaxially coupled to the cage assembly, and wherein the cage and actuator assemblies include cage and actuator driving dogs, respectively, and wherein actuator assembly further includes a coupling block operatively coupling the cage and actuator driving dogs to one another to allow for torque to be transmitted between the actuator assembly to the cage assembly.

4. A rotary valve assembly comprising:
   an elongate spool defining coaxially aligned inlet and outlet ports for respectively receiving and discharging a fluid, and spool inlet and outlet orifices in fluid communication with the inlet and outlet ports, respectively;
   a rotary cage assembly coaxially surrounding the spool and mounted for reciprocal rotations thereabout, wherein the cage assembly defines an annular cage recess and oriented cage inlet and outlet orifices in communication with the recess; and
   an actuator assembly coupled to the rotary cage assembly for moving the rotary cage assembly between an open position wherein the cage inlet and outlet orifices are in fluid communication with the spool inlet and outlet orifices, respectively, to allow fluid to flow from the spool inlet port to the spool outlet port by way of the annular cage recess, and a closed position wherein fluid communication is blocked between at least the cage and spool outlet orifices, whereby fluid is prevented from flowing from the spool inlet port to the spool outlet port, wherein the actuator assembly further comprises (a) a rotary actuator coaxially coupled to the cage assembly, and (b) a rectilinearly moveable actuator member coupled operative to the rotary actuator member such that reciprocal rectilinear movements of the rectilinearly moveable actuator member are translated into reciprocal rotational movements of the rotary actuator member.

5. A rotary valve assembly as in claim 4, wherein the rectilinearly moveable actuator member includes a slot, and wherein the rotary actuator member includes an outwardly protruding actuator finger received within the slot.

6. A rotary valve assembly comprising:
an elongate spool defining coaxially aligned inlet and outlet ports for respectively receiving and discharging a fluid, and spool inlet and outlet orifices in fluid communication with the inlet and outlet ports, respectively;
a rotary cage assembly coaxially surrounding the spool and mounted for reciprocal rotations thereabout, wherein the cage assembly defines an annular cage recess and oriented cage inlet and outlet orifices in communication with the recess; and
an actuator assembly coupled to the rotary cage assembly for moving the rotary cage assembly between an open position wherein the cage inlet and outlet orifices are in fluid communication with the spool inlet and outlet orifices, respectively, to allow fluid to flow from the spool inlet port to the spool outlet port by way of the annular cage recess, and a closed position wherein fluid communication is blocked between at least the cage and spool outlet orifices, whereby fluid is prevented from flowing from the spool inlet port to the spool outlet port, wherein
the cage assembly includes an inner cage member which defines the cage inlet and outlet orifices, and an outer cage member coaxially surrounding and integrally coupled to the inner cage member, wherein the cage recess is defined between the inner and outer cage members.

7. A rotary valve assembly as in claim 6, wherein
the spool further defines a bypass port and a bypass orifice in communication therewith, and wherein
the cage further defines a cage bypass orifice in fluid communication with the annular cage recess, and wherein
the cage assembly when in the open condition prevents fluid communication between the cage and spool bypass orifices, but when in the closed condition allows fluid communication between the cage and spool inlet orifices and between the cage and spool bypass orifices, whereby fluid entering the annular cage recess from the spool inlet port through the spool inlet orifice is allowed to flow into the spool bypass port through the cage bypass orifice.

8. A rotary valve assembly as in claim 6, wherein the outer cage defines a cage slot, and wherein the inner cage defines an outwardly protruding lug received within the cage slot so as to integrally couple the inner and outer cages to one another.

9. A rotary valve assembly comprising:
a fixed position spool defining fluid inlet and outlet ports;
a rotary cage assembly surrounding the spool for rotary movement thereabout between an open position wherein fluid communication is established between the inlet and outlet ports, and a closed position wherein fluid communication is blocked between the inlet and outlet ports; and
a rotary actuator assembly coaxially positioned relative to the rotary cage and spool for moving the rotary cage between the open and closed positions thereof, wherein
the actuator assembly further comprises a rotary actuator member and a rectilinearly moveable actuator member coupled operative to the rotary actuator member such that reciprocal rectilinear movements of the rectilinearly moveable actuator member are translated into reciprocal rotational movements of the rotary actuator member.

10. A rotary valve assembly as in claim 9, wherein the rectilinearly moveable actuator member includes a slot, and wherein the rotary actuator member includes an outwardly protruding actuator finger received within the slot.

11. A rotary valve assembly comprising:
a fixed position spool defining fluid inlet and outlet ports;
a rotary cage assembly surrounding the spool for rotary movement thereabout between an open position wherein fluid communication is established between the inlet and outlet ports, and a closed position wherein fluid communication is blocked between the inlet and outlet ports; and
a rotary actuator assembly coaxially positioned relative to the rotary cage and spool for moving the rotary cage between the open and closed positions thereof, wherein
the spool defines spool inlet and outlet orifices in fluid communication with the inlet and outlet ports, respectively; and
the cage assembly includes an inner cage member which defines cage inlet orifice and outlet orifices, an outer cage member coaxially surrounding and integrally coupled to the inner cage member, and an annular cage recess defined between the inner and outer cage members which is in fluid communication with the cage inlet and outlet orifices, and wherein
the cage inlet and outlet orifices are moveable into fluid communication with the spool inlet and outlet orifices, respectively, when the cage assembly is moved into the open position thereof.

12. A rotary valve assembly as in claim 11, wherein
the spool further defines a bypass port and a bypass orifice in communication therewith, and wherein
the cage further defines a cage bypass orifice in fluid communication with the annular cage recess, and wherein
the cage assembly when in the open position prevents fluid communication between the cage and spool bypass orifices, but when in the closed position allows fluid communication between the cage and spool inlet orifices and between the cage and spool bypass orifices, whereby fluid entering the annular cage recess from the spool inlet port through the spool inlet orifice is allowed to flow into the spool bypass port through the cage bypass orifice.

13. A fluid delivery system comprising:
a manifold,
a rotary valve assembly operatively positioned within the manifold and including a fluid inlet port for receiving fluid under pressure from a fluid source and a fluid outlet port coaxially aligned with the fluid inlet port for delivering fluid from the fluid source; and
an actuator assembly coaxially coupled to the rotary valve assembly for rotationally moving the rotary valve between open and closed positions wherein fluid from the fluid source is selectively allowed to be and prevented from being, respectively, delivered through the outlet port, wherein
the rotary valve assembly includes,
(a) an elongate spool defining the coaxially aligned inlet and outlet ports for respectively receiving and discharging the fluid, and spool inlet and outlet orifices;
(b) a rotary cage assembly coaxially surrounding the spool and mounted for reciprocal rotations thereabout, wherein the cage assembly defines an annular cage recess and cage inlet and outlet orifices in communication with the recess, wherein
(c) when the actuator assembly moves the rotary cage assembly into the open position, the cage inlet and outlet orifices are in fluid communication with the spool inlet and outlet orifices, respectively, to allow fluid to flow from the spool inlet port to the spool outlet port by way of the annular cage recess, and wherein (d) when the actuator assembly moves the rotary cage assembly into the closed position, respective fluid communication between at least the cage and spool outlet orifices is blocked, whereby fluid is prevented from flowing from the spool inlet port to the spool outlet port, and wherein the spool further defines a bypass port and a bypass orifice in communication therewith, and wherein the cage further defines a cage bypass orifice in fluid communication with the annular cage recess, and wherein the cage assembly when in the open condition prevents fluid communication between the cage and spool bypass orifices, but when in the closed condition allows fluid communication between the cage and spool inlet orifices and between the cage and spool bypass orifices, whereby fluid entering the annular cage recess from the spool inlet port through the spool inlet orifice is allowed to flow into the spool bypass port through the cage bypass orifice.

14. A fluid delivery system as in claim 13, wherein the actuator assembly comprises a rotary actuator coaxially coupled to the cage assembly.

15. A fluid delivery system comprising:
a manifold,
a rotary valve assembly operatively positioned within the manifold and including a fluid inlet port for receiving fluid under pressure from a fluid source and a fluid outlet port coaxially aligned with the fluid inlet port for delivering fluid from the fluid source; and
an actuator assembly coaxially coupled to the rotary valve assembly for rotationally moving the rotary valve between open and closed positions wherein fluid from the fluid source is selectively allowed to be and prevented from being, respectively, delivered through the outlet port, wherein
the rotary valve assembly includes,
(a) an elongate spool defining the coaxially aligned inlet and outlet ports for respectively receiving and discharging the fluid, and spool inlet and outlet orifices;
(b) a rotary cage assembly coaxially surrounding the spool and mounted for reciprocal rotations thereabout, wherein the cage assembly defines an annular cage recess and cage inlet and outlet orifices in communication with the recess, wherein
(c) when the actuator assembly moves the rotary cage assembly into the open position, the cage inlet and outlet orifices are in fluid communication with the spool inlet and outlet orifices, respectively, to allow fluid to flow from the spool inlet port to the spool outlet port by way of the annular cage recess, and wherein
(d) when the actuator assembly moves the rotary cage assembly into the closed position, respective fluid communication between at least the cage and spool outlet orifices is blocked, whereby fluid is prevented from flowing from the spool inlet port to the spool outlet port, and wherein
the actuator assembly comprises a rotary actuator coaxially coupled to the cage assembly, and wherein
the cage and actuator assemblies include cage and actuator driving dogs, respectively, and wherein actuator assembly further includes a coupling block operatively coupling the cage and actuator driving dogs to one another to allow for torque to be transmitted between the actuator assembly to the cage assembly.

16. A fluid delivery system comprising:
a manifold,
a rotary valve assembly operatively positioned within the manifold and including a fluid inlet port for receiving fluid under pressure from a fluid source and a fluid outlet port coaxially aligned with the fluid inlet port for delivering fluid from the fluid source; and
an actuator assembly coaxially coupled to the rotary valve assembly for rotationally moving the rotary valve between open and closed positions wherein fluid from the fluid source is selectively allowed to be and prevented from being, respectively, delivered through the outlet port, wherein
the rotary valve assembly includes,
(a) an elongate spool defining the coaxially aligned inlet and outlet ports for respectively receiving and discharging the fluid, and spool inlet and outlet orifices;
(b) a rotary cage assembly coaxially surrounding the spool and mounted for reciprocal rotations thereabout, wherein the cage assembly defines an annular cage recess and cage inlet and outlet orifices in communication with the recess, wherein
(c) when the actuator assembly moves the rotary cage assembly into the open position, the cage inlet and outlet orifices are in fluid communication with the spool inlet and outlet orifices, respectively, to allow fluid to flow from the spool inlet port to the spool outlet port by way of the annular cage recess, and wherein
(d) when the actuator assembly moves the rotary cage assembly into the closed position, respective fluid communication between at least the cage and spool outlet orifices is blocked, whereby fluid is prevented from flowing from the spool inlet port to the spool outlet port, and wherein
the actuator assembly comprises a rotary actuator coaxially coupled to the cage assembly, and wherein
the actuator assembly further comprises a rectilinearly moveable actuator member coupled operative to the rotary actuator member such that reciprocal rectilinear movements of the rectilinearly moveable actuator member are translated into reciprocal rotational movements of the rotary actuator member.

17. A fluid delivery system as in claim 16, wherein the rectilinearly moveable actuator member includes a slot, and wherein the rotary actuator member includes an outwardly protruding actuator finger received within the slot.

18. A fluid delivery system comprising:
a manifold,
a rotary valve assembly operatively positioned within the manifold and including a fluid inlet port for receiving fluid under pressure from a fluid source and a fluid outlet port coaxially aligned with the fluid inlet port for delivering fluid from the fluid source; and
an actuator assembly coaxially coupled to the rotary valve assembly for rotationally moving the rotary valve between open and closed positions wherein fluid from the fluid source is selectively allowed to be and prevented from being, respectively, delivered through the outlet port, wherein
the rotary valve assembly includes,
(a) an elongate spool defining the coaxially aligned inlet and outlet ports for respectively receiving and discharging the fluid, and spool inlet and outlet orifices;
(b) a rotary cage assembly coaxially surrounding the spool and mounted for reciprocal rotations thereabout, wherein the cage assembly defines an annular cage recess and cage inlet and outlet orifices in communication with the recess, wherein (c) when the actuator assembly moves the rotary cage assembly into the open position, the cage inlet and outlet orifices are in fluid communication with the spool inlet and outlet orifices, respectively, to allow fluid to flow from the spool inlet port to the spool outlet port by way of the annular cage recess, and wherein (d) when the actuator assembly moves the rotary cage assembly into the closed position, respective fluid communication between at least the cage and spool outlet orifices is blocked, whereby fluid is prevented from flowing from the spool inlet port to the spool outlet port, and wherein the cage assembly includes an inner cage member which defines the cage inlet and outlet orifices, and an outer cage member coaxially surrounding and integrally coupled to the inner cage member, wherein the cage recess is defined between the inner and outer cage members.

19. A fluid delivery system as in claim 18, wherein the spool further defines a bypass port and a bypass orifice in communication therewith, and wherein the cage further defines a cage bypass orifice in fluid communication with the annular cage recess, and wherein the cage assembly when in the open condition prevents fluid communication between the cage bypass orifice and the spool bypass orifice, but when in the closed condition allows fluid communication between the cage and spool inlet orifices and between the cage and spool bypass orifices, whereby fluid entering the annular cage recess from the spool inlet port through the spool inlet orifice is allowed to flow into the spool bypass port through the cage bypass orifice.

20. A fluid delivery system as in claim 18, wherein the outer cage defines a cage slot, and wherein the inner cage defines an outwardly protruding lug received within the cage slot so as to integrally couple the inner and outer cages to one another.

21. A fluid delivery system as in claim 19, further comprising a pressurized fluid supply conduit for supply the fluid under pressure from the fluid source to the spool inlet port, and a fluid return conduit in fluid communication with the spool bypass port returning the fluid to the fluid source.

22. A method of delivering fluid under pressure from a fluid source comprising:

(a) providing an elongate fluid supply spool having coaxially aligned spool inlet and outlet ports, spool inlet and outlet orifices in respective fluid communication with the spool inlet and outlet ports, a bypass port and a bypass orifice in communication with the bypass port;

(b) supplying fluid under pressure to the spool inlet port associated with the spool; and (c) delivering fluid through the spool outlet port by operating a rotary cage assembly surrounding the spool and having an annular cage recess, and cage inlet and outlet orifices so that the rotary cage assembly rotationally moves from a closed position wherein fluid communication is blocked between at least the cage and spool outlet orifices, whereby fluid is prevented from flowing from the spool inlet port to the spool outlet port through the annular cage recess, and into an open position wherein the cage inlet and outlet orifices are in fluid communication with the spool inlet and outlet orifices, respectively, to allow fluid to flow from the spool inlet port to the spool outlet port by way of the annular cage recess; and (d) rotating the cage assembly into the closed position so that a cage bypass orifice in communication with the annular cage recess is brought into fluid communication with the spool bypass orifice so that fluid entering the annular cage recess from the spool inlet port through the spool inlet orifice is allowed to flow into the spool bypass port through the cage bypass orifice.

23. A method of delivering fluid under pressure from a fluid source comprising:

(a) providing an elongate fluid supply spool having coaxially aligned spool inlet and outlet ports spool inlet and outlet orifices in respective fluid communication with the spool inlet and outlet ports;

(b) supplying fluid under pressure to the spool inlet port associated with the spool; and (c) delivering fluid through the spool outlet port by operating a rotary cage assembly surrounding the spool and having an annular cage recess, and cage inlet and outlet orifices so that the rotary cage assembly rotationally moves from a closed position wherein fluid communication is blocked between at least the cage and spool outlet orifices, whereby fluid is prevented from flowing from the spool inlet port to the spool outlet port through the annular cage recess, and into an open position wherein the cage inlet and outlet orifices are in fluid communication with the spool inlet and outlet orifices, respectively, to allow fluid to flow from the spool inlet port to the spool outlet port by way of the annular cage recess, wherein step (c) comprises:

(c1) operating a rectilinearly moveable actuator member coupled to a rotary actuator member in such a manner that the rectilinear movement of the rectilinearly moveable actuator member is translated into rotary movement of the rotary actuator member.

24. The method of claim 23, wherein step (c) comprises alternately operating pneumatic valves so as to selectively move the rectilinearly moveable actuator between one and another opposite positions corresponding to the closed and open positions, respectively of the cage assembly.

* * * * *